United States Patent Office 3,548,021
Patented Dec. 15, 1970

3,548,021
PRODUCTION OF PARAXYLENE
Donald N. Brattesani, La Habra, Calif., assignor to Union Oil Company of California, Los Angeles, Calif., a corporation of California
No Drawing. Filed June 27, 1968, Ser. No. 740,489
Int. Cl. C07c 5/22
U.S. Cl. 260—673.5
7 Claims

ABSTRACT OF THE DISCLOSURE

Paraxylene is obtained in a good yield by the oxidative dimerization of isobutylene using a Group VIII noble metal in an elevated oxidation state and a redox agent and oxygen to maintain elevated oxidation state of the Group VIII metal. In a specific embodiment, isobutylene and oxygen are contacted with a catalyst comprising palladium chloride, cupric chloride and sodium acetate in an acetic acid solvent at a temperature of 300° F. Paraxylene is produced along with isobutenyl acetate and methacrolein and methacrylic acid.

DESCRIPTION OF THE INVENTION

The invention relates to the production of aromatics from olefins and specifically to the dimerization under oxidizing conditions of isobutylene to produce paraxylene.

It has recently been reported in Recueil, vol. 86, page 677 (1967) that the oxidative dimerization of beta-substituted alpha-olefins can be catalyzed by palladium acetate and sodium acetate. This oxidative dimerization is reported to produce 1,1,4,4-tetra-substituted-1,3-butadiene. It is further stated that prolonged oxidation of the primary product by an excess of oxidant may lead to a benzene derivative.

While this reaction is of academic interest, it lacks commercial interest because of the consumption of the noble metal salt which is reduced to the noble metal by the oxidation. This reduction requires that the noble metal salt be used in stoichiometric equivalent quantities to the olefin and the expense in maintaining an inventory of this precious metal oxidant precludes the commercial utilization of this reaction.

I have now found that the oxidative dimerization can be made catalytic in the requirements for the noble metal oxidizing agent by the incorporation of a suitable redox agent in the catalyst and by introducing oxygen simultaneously with the introduction of the olefin. In this fashion the oxidant for the reaction is oxygen which can be supplied in commercial quantities and which obviates the expense involved in maintaining an inventory of the previous noble metal oxidant for the reaction.

Surprisingly, I have found that the use of a redox agent and the introduction of oxygen permits a single step oxidative dimerization of the isobutylene directly to paraxylene. This is surprising in view of the aforecited publication which states that the second step of the oxidative reaction, i.e., formation of the benzene derivative is the slower reaction. Accordingly, it would be expected that a large concentration of the intermediate dimethyl hexadiene would be present in the reaction and be recovered with the products of the oxidation, necessitating its recycling for complete conversion to paraxylene. Instead I have found that the hexadiene derivative does not accumulate in the reaction zone to any measurable degree, but instead is rapidly and efficiently converted to paraxylene.

In view of the prior art knowledge that the oxidation of olefins in the presence of carboxylic acids rapidly converts the olefins to acid esters of unsaturated alcohols corresponding to the olefin and in view of the prior art knowledge that in the presence of water the oxidation of olefins as catalyzed by Group VIII noble metals readily forms carbonyl products such as aldehydes and acids, it was surprising to find that the oxidative dimerization of the olefin could nevertheless be accomplished in the presence of oxygen. The introduction of oxygen into the oxidation zone to oxidize the redox agent forms water which accumulates in the reaction since the oxidative dimerization is not a water consuming reaction. Surprisingly, I have found that the presence of water does not preclude the oxidative dimerization reaction, but this reaction can nevertheless be performed in relatively high efficiency to obtain a good yield of dimerized product.

The reaction is performed under liquid phase conditions in the presence of a liquid organic solvent which has a solvency for the catalyst and which, preferably, is inert to the reaction conditions. Various organic liquids can be employed for this purpose such as sulfones, amides, ketones, ethers and esters. Also, carboxylic acids such as the lower molecular weight fatty acids or benzene carboxylic acids can also be employed as a solvent.

Illustrative of this last class of solvents are acetic, propionic, butyric, pentanoic, hexanoic, heptanoic, octanoic acids, benzoic, toluic, phthalic acids, etc. Of these, the fatty carboxylic acids having from about 2 to about 8 carbons are preferred.

Other organic solvents that can be employed include the alkyl and the aryl sulfones such as di-isopropylsulfone, butylamylsulfone, methylbenzylsulfone, etc.

Another class of organic solvents that have sufficient solvency for the catalyst salts and that are inert to the oxidative carboxylation are various amides such as formamide, N,N-dimethylformamide, N,N-ethylisopropylformamide, acetamide, N-phenylacetamide, N,N-dipropylacetamide, iso-butyramide, N-ethylisobutyramide, isovaleramide, N,N-dimethylisovaleramide, isocaprylamide, N,N-methyl-n-caprylamide, N-propyl-n-heptanoyl amide, isoundecylamide, etc.

Various alkyl and aryl ketones can also be employed as a reaction solvent, e.g., acetone, methyl ethyl ketone, diethyl ketone, di-isopropyl ketone, ethyl n-butyl ketone, methyl n-amyl ketone, cyclohexanone, di-iso-butyl ketone, etc.

Ethers can also be employed as a reaction solvent, e.g., di-iso-propyl ether, di-n-butyl ether, ethylene glycol di-iso-butyl ether, methyl o-tolyl ether, ethylene glycol dibutyl ether, di-iso-amyl ether, methyl p-tolyl ether, methyl m-tolyl ether, dichloroethyl ether, ethylene glycol di-isoamyl ether, diethylene glycol diethyl ether, ethyl benzyl ether, diethylene glycol di-ethyl ether, diethylene glycol dimethyl ether, ethylene glycol dibutyl ether, ethylene glycol diphenyl ether, triethylene glycol diethyl ether, diethylene glycol di-n-hexyl ether, tetraethylene glycol dimethyl ether, tetraethylene glycol dibutyl ether, etc.

Various esters can also be employed as a solvent, e.g., ethyl formate, methyl acetate, ethyl acetate, n-propyl formate, isopropyl acetate, ethyl propionate, n-propyl acetate, sec-butyl acetate, isobutyl acetate, ethyl n-butyrate, n-butyl acetate, isoamyl acetate, n-amyl acetate, ethyl formate, ethylene glycol diacetate, glycol diformate, cyclohexyl acetate, furfuryl acetate, isoamyl n-butyrate, diethyl oxalate, isoamyl isovalerate, methyl benzoate, diethyl malonate, valerolactone, ethyl benzoate, methyl salicylate, n-propyl benzoate, n-dibutyl oxalate, n-butyl benzoate, diisoamyl phthalate, dimethyl phthalate, diethyl phthalate, benzyl benzoate, n-dibutyl phthalate, etc.

As previously mentioned, the reaction medium should contain catalytic amounts of a platinum group metal. The platinum group metal can be of the palladium subgroup or the platinum subgroup, i.e., palladium, rhodium or ruthenium, or platinum, osmium or iridium. While all of these metals are active for the reaction, I prefer palladium because of its demonstrated greater activity. The platinum group metal can be employed in amounts between about 0.001 and about 5 weight percent of the liquid reaction medium; preferably between about 0.04 and about 2.0 weight percent. The platinum group metal can be added to the reaction medium as a finely divided metal, as a soluble salt or as a chelate. Preferably, the metal in its most oxidized form, i.e., as a soluble salt or chelate, is introduced into the reaction zone to avoid the formation of undesired quantities of water. Examples of suitable salts are the halides and carboxylates of the metals such as platinum chloride, rhodium acetate, ruthenium bromide, osmium propionate, iridium benzoate, palladium isobutyrate, etc. Examples of suitable chelates are palladium acetylacetonate, and complexes of the palladium group metal ions with such conventional chelating agents as ethylene diamine tetraacetic acid, citric acid, etc.

To facilitate the rate of oxidation by rendering it more facile to oxidize the reduced form of the platinum metal, I prefer to employ a reaction medium that contains a halogen, i.e., a bromine- or chlorine- (preferably a chlorine) containing compound. The halogen can be added as elemental chlorine or bromine; however, it is preferred to employ less volatile halogen compounds such as hydrogen, alkali metal or ammonium halides, e.g., hydrogen chloride; hydrogen bromide, cesium chloride, potassium bromide, sodium bromate, lithium chlorate; ammonium bromide, ammonium chloride, etc. Also, any of the aforementioned platinum group metals can be added to supply a portion of the bromide or chloride and, when the hereafter mentioned multivalent redox salts are employed, these too can be added as a chloride or bromide.

In general, sufficient of any of the aforementioned halogen-containing compounds can be added to provide between about 0.05 and about 5.0 weight percent free or coordinately bonded halogen in the reaction zone; preferably concentrations between about 0.1 and about 3.0 weight percent are employed. This amount of halogen is preferably also in excess of the stoichiometric quantity necessary to form the halide of the most oxidized state of platinum group metal, e.g., in excess of two atomic weights of halogen per atomic weight of palladium present. In this manner, a rapid oxidation can be achieved.

As previously mentioned, various redox compounds are used in the reaction medium to accelerate the rate of reaction. In general, any multivalent metal salt having an oxidation potential higher, i.e., more positive, than the platinum metal in the solution can be used. Typical of such are the soluble salts of the multivalent metal ions such as the carboxylates, e.g., propionates, benzoates, acetates, etc.; nitrates; sulfates; halides, e.g., bromides, chlorides, etc.; of copper, iron, manganese, cobalt, mercury, nickel, cerium, uranium, bismuth, tantalum, chromium, molybdenum or vanadium. Of these, cupric and ferric salts are preferred and cupric salts are most preferred. The multivalent metal ion salt can be added to the reaction medium to provide a concentration of the metal therein between about 0.1 and about 10 weight percent; preferably between about 0.5 and about 3.0 weight percent.

Various other oxidizing agents can also be employed to accelerate the rate of reaction. Included in such agents are the nitrogen oxides that function as redox agents similar to those previously described. These nitrogen oxides can be employed as the only redox agent in the reaction medium or they can be employed jointly with one or more of the aforedescribed redox metal salts such as a combination of a nitrogen oxide and a cupric redox agent or ferric redox agent. Between about 0.01 and about 3 weight percent of the reaction medium; preferably between about 0.1 and about 1 weight percent; calculated as nitrogen dioxide can comprise a nitrogen oxide that is added as a nitrate or nitrite salt or nitrogen oxide vapors. The nitrogen oxides can be added to the reaction medium in various forms, e.g., nitrogen oxide vapors such as nitric oxide, nitrogen dioxide, nitrogen tetraoxide, etc. can be introduced into contact with the reaction medium during the oxidation to fix the aforementioned nitrogen oxide content therein or soluble nitrate or nitrite salts such as sodium nitrate, lithium nitrate, lithium nitrite, poassium nirate, cesium nitrate, etc. can be added to the reaction medium.

The reaction medium should also contain an alkali metal carboxylate as a cocatalyst such as sodium acetate, lithium propionate, potassium isobutyrate, cesium valerate, sodium hexanoate, lithium heptanoate, etc. The carboxylate can be the alkali metal salt of an alkanoic acid having from 2 to about 10 carbons, preferably, from 2 to about 5 and, most preferably, an acetate salt. The carboxylate can be present in a reaction medium in an amount from about 0.1 to about 10.0 weight percent of the reaction medium; preferably from about 0.5 to about 7 weight percent.

The process may be operated in a continuous manner by using a platinum group metal and redox agent which participate in a catalytic manner. Isobutylene and oxygen are introduced into contact with the liquid reaction medium containing the aforementioned catalyst, cocatalyst and redox agent and the oxidative dimerization of the isobutylene results in the stoichiometric reduction of the platinum group metal while introduction of oxygen and the presence of the redox agent serves to reoxidize the reduced metal to its more oxidized and active form. Continuous or intermittent introduction of oxygen can be employed, however continuous introduction is preferred. Preferably the rate of oxygen introduction is controlled relative to the isobutylene introduction so as to maintain the oxygen content of the exit gases below an explosive concentration, i.e., less than about 10 and preferably less than about 3 volume percent. To dilute the oxygen content in the vapor phase of the reactor an inert gas such as nitrogen, carbon dioxide, air, or mixtures of these inert gases with oxygen can be employed to dilute the gase phase from the reactor and thereby avoid explosive gas compositions.

The reaction can be employed under relatively mild conditions, e.g., temperatures from about 30° to about 300° C.; preferably from about 70° to about 150° C. are employed. The reaction pressure employed is sufficient to maintain a liquid phase and, preferably, slightly superatmospheric pressures are used to increase solubility of the gas reactants in the reaction medium and thereby accelerate the reaction rate. Accordingly, pressures from about atmospheric to about 200 atmospheres to more, preferably elevated pressures from about 10 to about 100 atmospheres are used.

During the oxidation a portion of the liquid reaction medium can be continuously withdrawn and distilled to recover the desired products therefrom and the catalyst salts contained in the reaction medium can be recycled to the reaction zone for further contacting. Water formed during the reaction is removed from the withdrawn portion of the reaction medium in the product distillation and the recycle reaction medium containing the catalytic salts can be returned substantially anhydrous for further contacting.

The following example will illustrate a mode of performing of the reaction and demonstrate results obtainable thereby:

EXAMPLE 1

The oxidative dimerization of isobutylene to produce paraxylene was performed by charging a one-half gallon capacity Teflon-lined autoclave with 5 grams palladium chloride, 2 grams cuprous chloride, 2 grams cupric chloride, 5 grams sodium acetate and 400 grams acetic acid. To the reactants was added 5 grams isobutylene and the autoclave was pressured to 50 p.s.i.g. with nitrogen gas and then heated at 300° F. Oxygen was slowly introduced at 10 p.s.i. increments and upon the introduction of oxygen the reaction was initiated and was performed for 20 minutes. Upon completion of the reaction period the autoclave was cooled, depressured and drained and the liquid reaction medium was analyzed by gas chromatography to reveal the following yields of products based on isobutylene.

| Product: | Yield, mol percent |
|---|---|
| Isobutenyl acetate | 53.5 |
| Methacrolein | 3.2 |
| Paraxylene | 31.7 |
| Methacrylic acid | 11.5 |

The yields of products obtained from the reaction evidence that paraxylene is produced in an attractive yield. The byproducts of the oxidation such as methacrolein and methacrylic acid are commercially useful products having a high value and thereby enhance the commercial attractiveness of the reaction. These products are also readily separable from the paraxylene product. The isobutenyl acetate produced in the greatest yield is likewise useful in that it can be an intermediate for merchandable products by hydrolysis to isobutyraldehyde and acetic acid, the former being convertible to methacrylonitrile by contacting with ammonia and oxygen in the presence of a support catalyst.

When the reaction is repeated with the substitution of platinum chloride or iridium chloride in an equivalent weight amount for the palladium chloride, substantially the same results are obtained; however, a slower reaction rate is observed.

When the reaction is repeated with the substitution of a nitrogen oxide, e.g., nitric acid for the cupric chloride, similar oxidative dimerization to produce paraxylene occurs.

When the reaction is repeated with substitution of 7.5 grams lithium valerate for the sodium acetate, a similar oxidative dimerization to paraxylene occurs.

The preceding examples are intended solely to illustrate a mode of practice of the invention and to demonstrate results obtainable thereby. It is not intended that the examples be construed as unduly limiting of the invention but instead it is intended that the invention be defined by the steps and reagents and their obvious equivalents set forth in the following claims.

I claim:
1. The method for producing paraxylene from isobutylene which comprises contacting isobutylene and oxygen with a substantially anhydrous reaction medium comprising a carboxylic acid and containing in catalytic quantities from 0.001–5 weight percent of a Group VIII noble metal in an elevated oxidation state, from 0.1 to about 10 weight percent of a redox agent therefor selected from the class consisting of multivalent metal salts having oxidation potentials more positive than said Group VIII noble metal in said solution and nitric acid and alkali metal salts thereof, and from 0.1 to 10 weight percent of an alkali metal salt of an alkanoic acid having from 2 to 10 carbons; said contacting being effected at a temperature from 30° to 300° C. and a pressure from atmospheric to 200 atmospheres, sufficient to maintain liquid phase conditions; and recovering paraxylene from said reaction medium.

2. The method of claim 1 wherein said Group VIII noble metal is palladium.

3. The method of claim 1 wherein said redox agent is a soluble cupric salt.

4. The method of claim 1 wherein said carboxylic acid is acetic acid.

5. The method of claim 1 wherein said alkali metal carboxylate is sodium acetate.

6. The method of claim 1 wherein the reaction medium includes a free or coordinately bonded halogen.

7. The method of claim 2 wherein said redox agent is a cupric salt and said reaction medium includes a halogen.

References Cited

FOREIGN PATENTS

| 971,575 | 9/1964 | Great Britain | 260—673 |
| 969,017 | 9/1964 | Great Britain | 260—673 |
| 969,018 | 9/1964 | Great Britain | 260—673 |

OTHER REFERENCES

Recueil, vol. 86, p. 677 (1967).

DELBERT E. GANTZ, Primary Examiner

J. M. NELSON, Assistant Examiner